US006828272B2

(12) United States Patent
Wiegner et al.

(10) Patent No.: US 6,828,272 B2
(45) Date of Patent: Dec. 7, 2004

(54) CATALYST SYSTEMS FOR POLYCONDENSATION REACTIONS

(75) Inventors: Jens-Peter Wiegner, Halle (DE); Rolf Eckert, Halle (DE); Volkmar Voerckel, Merseburg (DE); Gunter Feix, Halle (DE); Marion Sela, Halle (DE); Sarat Munjal, Lake Jackson, TX (US)

(73) Assignee: Equipolymers GmbH, Schkopau (DE)

( * ) Notice: Subject to any disclaimer, the term of this patent is extended or adjusted under 35 U.S.C. 154(b) by 0 days.

(21) Appl. No.: 10/149,173

(22) PCT Filed: Dec. 7, 2000

(86) PCT No.: PCT/US00/33386

§ 371 (c)(1),
(2), (4) Date: Oct. 25, 2002

(87) PCT Pub. No.: WO01/42335

PCT Pub. Date: Jun. 14, 2001

(65) Prior Publication Data

US 2003/0216253 A1 Nov. 20, 2003

Related U.S. Application Data

(60) Provisional application No. 60/170,054, filed on Dec. 10, 1999, and provisional application No. 60/249,324, filed on Nov. 16, 2002.

(51) Int. Cl.$^7$ .......................... B01J 27/14; B01J 23/40; B01J 23/02; C01F 7/02; C01F 7/04
(52) U.S. Cl. ...................... 502/208; 502/327; 502/341; 502/342; 502/343; 502/344; 502/345; 502/346; 423/593; 423/600; 423/629
(58) Field of Search ................................ 502/208, 327, 502/341–346; 423/593, 600, 629

(56) References Cited

U.S. PATENT DOCUMENTS

| | | | |
|---|---|---|---|
| 3,879,525 A | * 4/1975 | Miyata et al. | 423/277 |
| 3,965,071 A | 6/1976 | McClelland | 260/75 |
| 3,998,793 A | 12/1976 | Gey et al. | 260/75 |
| 4,039,515 A | 8/1977 | Rebhan et al. | 260/75 |
| 4,067,856 A | 1/1978 | Muntz et al. | 260/75 |
| 4,067,857 A | 1/1978 | Muntz | 260/75 |
| 4,077,944 A | 3/1978 | Weinberg et al. | 260/75 |
| 4,080,317 A | 3/1978 | Morawetz et al. | 260/75 |
| 4,104,263 A | 8/1978 | Kenney | 528/279 |
| 4,115,371 A | 9/1978 | Bier et al. | 528/279 |
| 4,116,942 A | 9/1978 | Weinberg et al. | 528/283 |
| 4,130,552 A | 12/1978 | Muntz | 528/285 |
| 4,131,601 A | 12/1978 | Hashimoto et al. | 528/279 |
| 4,133,800 A | 1/1979 | Taubinger et al. | 260/45.7 |
| 4,356,299 A | 10/1982 | Cholod et al. | 528/279 |
| 4,361,694 A | 11/1982 | Weinberg et al. | 528/279 |
| 4,454,312 A | 6/1984 | Kuze et al. | 528/275 |
| 4,468,489 A | 8/1984 | Weinberg et al. | 528/136 |
| 4,482,700 A | 11/1984 | Kühnrich et al. | 528/279 |
| 4,499,226 A | 2/1985 | Massey et al. | 524/382 |
| 5,008,230 A | 4/1991 | Nichols | 502/170 |
| 5,019,640 A | 5/1991 | Badar et al. | 528/272 |
| 5,066,766 A | 11/1991 | Jackson et al. | 528/190 |
| 5,138,024 A | 8/1992 | Brozek et al. | 528/283 |

(List continued on next page.)

FOREIGN PATENT DOCUMENTS

| | | | |
|---|---|---|---|
| EP | 0 172 636 | 2/1986 | C08G/63/06 |
| EP | 0 812 818 | 2/1986 | C07C/67/08 |
| JP | 56059864 | 5/1981 | C08L/67/02 |
| JP | 61118457 | 6/1986 | C08L/67/02 |
| JP | 02308848 | 12/1990 | C08L/67/02 |
| JP | 09077962 | 3/1997 | C08L/67/02 |
| JP | 09208683 | 8/1997 | C08G/64/04 |
| WO | WO 97/45470 | 12/1997 | C08G/63/85 |
| WO | 03/004547 | 1/2003 | C08G/63/82 |
| WO | 04/014982 | 2/2004 | C08G/63/00 |

OTHER PUBLICATIONS

Database WPI Section Ch, Week 200259 Derwent Publications Ltd., GB. AN 2002–552784 XP 002226337 & JP 2002 155134 A (Toyobo KK), May 28, 2002 abstract.
Cavani et al. "Hydrotalcite–Type Anionic Clays: Preparation, Properties and Applications" Catalysis Today, NL, Amsterdam. col 11, 1991, pp. 173–301, XP 000537043 cited in the application pp. 175, 213–215. month not avail.
Patent Abstracts of Japan vol. 1998, No. 01. Jan. 30, 1998 & JP 09 241372 A (Teijin Ltd) Sep. 16, 1997 abstract.
Database Chemical Abstracts. Accession No. 133:151341. XP002163660. Abstract. Vasnev et al. Vysokomol. Soedin., Ser. A Ser.B. vol. 41, No. 11, 1999, pp. 1733–1738 month not avail.
Spectrochimica Acta, vol. 49A, No. 11, pp. 1575–1582, 1993. "A FTIR spectroscopic study of surface acidity and basicity of mixed Mg, Al–oxides obtained by thermal decomposition of hydrotalcite". M. Del Arco, C. Martin, I. Martin, V. Rives and R. Trujillano. Departmento de Quimica Inorganica, Universidad de Salamanca, Facultad de Farmacia.
Journal of Molecular Catalysis A: Chemical, accepted Oct. 30, 2003. "Heterogeneous basic catalysts for the transesterification and the polycondensation reactions in PET production from DMT". M. Di Serio, R. Tesser, A. Ferrara and E. Santacesaria. Dipartimento di Chimica, Universita di Napoli Ferederico II, Naples, Italy.

*Primary Examiner*—Mark L. Bell
*Assistant Examiner*—Patricia L. Hailey

(57) ABSTRACT

The invention pertains to new catalyst systems for polycondensation reactions, for example for producing polyethylene terephthalate. In accordance with the invention, complex compounds with hydrotalcite-analogous structures of general formula $[M(II)_{1-x}M(III)_x(OH)_2]^{x+}(A^{n-}_{x/n}) \cdot mH_2O$ are used, wherein M(II) represents divalent metals, preferably Mg or Zn or NI or Cu or Fe(II) or Co, and M(III) represents trivalent metals, for example Al or Fe(III), and A represents anions, preferably carbonates or borates. These catalysts can be calcinated and can be used in combination with phosphorus compounds that contain at least one hydrolyzable phosphorus-oxygen bond.

9 Claims, No Drawings

U.S. PATENT DOCUMENTS

| | | | |
|---|---|---|---|
| 5,225,115 A | 7/1993 | Musselman et al. | 252/609 |
| 5,247,103 A * | 9/1993 | King et al. | 549/510 |
| 5,286,836 A | 2/1994 | Park et al. | 528/275 |
| 5,302,690 A | 4/1994 | Kawaguchi et al. | 528/279 |
| 5,340,909 A | 8/1994 | Doerr et al. | 528/276 |
| 5,362,457 A | 11/1994 | Grubbs et al. | 423/115 |
| 5,378,796 A | 1/1995 | George et al. | 528/279 |
| 5,437,720 A | 8/1995 | Cox et al. | 106/415 |
| 5,474,762 A | 12/1995 | Carr et al. | 424/59 |
| 5,478,796 A | 12/1995 | Szoeke | 504/130 |
| 5,565,545 A | 10/1996 | Kriesche et al. | 528/285 |
| 5,596,069 A | 1/1997 | Goodley | 528/280 |
| 5,644,019 A | 7/1997 | Po et al | 528/272 |
| 5,656,221 A | 8/1997 | Schumann et al. | 264/85 |
| 5,656,716 A | 8/1997 | Schmidt et al. | 528/279 |
| 5,684,116 A | 11/1997 | Martl et al. | 528/176 |
| 5,714,570 A | 2/1998 | Kim et al. | 528/279 |
| 5,721,305 A | 2/1998 | Eshuis et al. | 524/442 |
| 5,744,571 A | 4/1998 | Hilbert et al. | 528/272 |
| 5,750,635 A | 5/1998 | Brink et al. | 528/285 |
| 5,780,575 A | 7/1998 | Brink et al. | 528/285 |
| 5,789,528 A | 8/1998 | Martl et al. | 528/279 |
| 5,830,981 A | 11/1998 | Koreishi et al. | 528/283 |
| 5,837,786 A | 11/1998 | Miyoshi et al. | 526/68 |
| 5,837,800 A | 11/1998 | Suzuki et al. | 528/193 |
| 5,902,873 A | 5/1999 | Banach et al. | 528/279 |
| 5,905,136 A | 5/1999 | Po et al. | 528/279 |
| 5,972,245 A * | 10/1999 | Schiller et al. | 252/397 |

\* cited by examiner

CATALYST SYSTEMS FOR POLYCONDENSATION REACTIONS

This application claims the benefit of in ternational application no. PC/US00/33386 filed on Dec. 7, 2000 which claims the benefit of U.S. Provisional Application Nos. 60/170054 filed Nov, 16, 2000.

The invention pertains to new catalyst systems for polycondensation reactions.

The synthesis of polyesters, for example polyethylene terephthalate, requires the use of catalysts in the polycondensation step. The literature contains an abundance of patents describing the use of various catalytically active substances. Today especially antimony and titanium compounds are used on a large industrial scale in the manufacturing of polyethylene terephthalate. This is also reflected in the large number of patents that describe the use of such compounds. Polyester-soluble antimony compounds are described in U.S. Pat. Nos. 3,965,071; 3,998,793; 4,039,515; 4,116,942; 4,133,800; 4,454,312; 5,750,635; and 5,780,575 as polycondensation catalysts. Modified antimony derivatives (stabilization by substances with double bonds to prevent reduction to metallic antimony) are, for example, subjects of U.S. Pat. Nos. 4,067,856; 4,067,857; and 4,130,552. Antimony salts of trimellitic acid esters are likewise used as catalysts in the manufacturing of polyethylene terephthalate (U.S. Pat. No. 5,478,796). Titanium derivatives, especially tetraalkyl titanates, are protected in the U.S. Pat. Nos. 4,039,515; 4,131,601; 4,482,700; 5,066,766; 5,302,690; WO 97/45470; and U.S. Pat. No. 5,744,571. A combination of sulfonic acid, titanate and antimony (or germanium) compound is the subject of U.S. Pat. No. 5,905,136. Germanium compounds are also described as catalysts for the polycondensation reaction (U.S. Pat. No. 5,378,796; 5,830,981; 5,837,786; and 5,837,800). Catalytically active compounds in a polycondensation reaction are likewise borates and acetates of zinc, calcium, cobalt, lead, cadmium, lithium, or sodium (U.S. Pat. No. 4,115,371).

Defined silicon compounds (2-cyanoethyltriethoxysilane and 3-aminopropyltriethoxysilane) are protected in a US Patent (U.S. Pat. No. 4,077,944) as polycondensation catalysts.

The combination of several metal compounds is described in the following patents: U.S. Pat. No. 4,080,317 (Sb/Pb/Zn, Sb/Pb/Ca, Sb/Zn, Sb/Pb/Mg, Sb/Pb/Ca/Mn, Sb/Pb/Ca/Zn, Sb/Pb/Li, Sb/Mn, Ti/Ca, Ge/Ga, Ge/Zn, and Ge/K); U.S. Pat. No. 4,104,263 (Sb(Zr)/Zn(Ca,Mn)); U.S. Pat. No. 4,122,107 (Sb/Zn(Ca,Mn)); U.S. Pat. No. 4,356,299, U.S. Pat. No. 4,501,878, and U.S. Pat. No. 5,286,836 (Ti/Sb); U.S. Pat. No. 4,361,694 (Ti/Si): U.S. Pat. No. 4,468,489 (Ti,Zr,Ge,Zn); U.S. Pat. No. 4,499,226 and U.S. Pat. No. 5,019,640 (Sb/Co); U.S. Pat. No. 5,008,230 (Co (Zn)/Zn(Mn,Mg,Ca)/Sb); U.S. Pat. No. 5,138,024 and U.S. Pat. No. 5,340,909 (Zn/Sb); U.S. Pat. No. 5,565,545 and U.S. Pat. No. 5,644,019 (Sb/Ge); U.S. Pat. No. 5,596,069 (Co/Al); U.S. Pat. No. 5,608,032 and U.S. Pat. No. 5,623,047 (Sb/Co(Mg,Zn,Mn,Pb)); U.S. Pat. No. 5,656,221 (Sb/Co/Mn); U.S. Pat. No. 5,714,570 (Sb/Ti/Zn); and U.S. Pat. No. 5,902,873 (Ti(Zr)/lanthanide). At least one constituent of these complex catalysts is a "classical" polycondensation catalyst, either antimony, titanium, or germanium.

Finely dispersed titanates are the subject of U.S. Pat. No. 5,656,716. Jointly precipitated titanium and silicon compounds and titanium and zirconium compounds are described in U.S. Pat. Nos. 5,684,116 and 5,789,528.

A polycondensation catalyst on the basis of zeolites (alkali or alkaline earth metal-modified aluminosilicate) is protected in U.S. Pat. No. 5,733,969. The use of titanium compounds leads to yellowing of the polyester produced during polycondensation and processing. Especially during the use of polyethylene terephthalate as a food packaging, this color is undesirable.

The use of antimony as a catalyst is permitted only within precisely established boundaries, since this substance, as a heavy metal, is physiologically problematic.

The goal of this invention is to discover a catalyst system for the polycondensation, especially of polyethylene terephthalate, polybutylene terephthalate, or polytrimethylene terephthalate, which is physiologically safe and makes it possible to use the polycondensation products for food packaging. In terms of catalytic activity in polycondensation and selectivity, it must be compatible with conventional catalysts and must not influence the processing properties of polyester at all or only to the desired degree.

Quite surprisingly, it was found that complex compounds with hydrotalcite-analogous structures of the general formula $[M(II)_{1-x}M(III)_x(OH)_2]^{x+}(A^{n-}_{x/n}) \cdot mH_2O$, (the use of which was previously described only as a filler (U.S. Pat. No. 5,362,457; U.S. Pat. No. 5,225,115; JP 09 077,962; JP 02 308,848; JP 61 118,457; JP 56 059,864), in olefin isomerizations, as an adsorbents (halogen trapper), as a carrier material for catalysts, flame retardant, molecular sieve, anion exchanger and catalyst for alcohol reactions (isophorone synthesis), hydrogenations, polymerizations, and reforming reactions (F. Cavani, F. Trifiro, A. Vaccari, *Catalysis Today* 11 (1991), 173–301)), before or after calcination, alone or in combination with phosphorus compounds that contain at least one hydrolyzable phosphorus-oxygen compound, are excellently suited for catalysis of polycondensation reactions, especially for the production of polyalkylene terephthalate.

In the formula mentioned, M(II) represents divalent metals, preferably Mg or Zn or Ni or Cu or Fe(II) or Co, and M(III) represents trivalent metals, preferably Al and Fe, and A represents anions, preferably carbonates or borates or titanyl compounds.

The particle size of the hydrotalcite used falls in the range of 0.1 to 50 $\mu$m, preferably 0.5 to 5 $\mu$m.

The calcination of the hydrotalcites can be performed at temperatures of 200° C. to 800° C., preferably at 400° C. to 650° C.

As phosphorus compounds which contain at least one hydrolyzable phosphorus-oxygen bond, phosphoric acid esters or esters of phosphorous acid can be used.

The catalyst system in accordance with the invention is used in the concentration ratio of hydrotalcite to phosphorus compound of 1:0.5 to 1:4, preferably 1:1 to 1:2.

The untreated or the calcinated hydrotalcite-analogous derivatives in combination with phosphorus compounds as stabilizers with at least one hydrolyzable phosphorus-oxygen bond show increased catalytic activity and selectivity in comparison to conventional catalysts and are characterized by high food compatibility.

It has been found that these substances, made up of several components, are highly catalytically selective, relatively independent of their composition, although the individual constituents catalyze polycondensation reactions either not at all or only with a very low selectivity and thus generate a high fraction of byproducts. It was also found that with the targeted selection of the constituents, surprisingly it was possible to influence the applications properties of the polyesters, for example the crystallization behavior. The polycondensation with the catalyst system in accordance with the invention is carried out under vacuum in a liquid phase at temperatures of 230° C. to 280° C. or in a solid phase at temperatures of 170 to 240° C.

The addition of phosphorus compounds with at least one hydrolyzable phosphorus-oxygen bond leads to improved thermal stability of the polyesters, especially in the industrially required long residence times of the liquid polyesters under normal pressure in comparison to polyesters produced with conventional [catalysts], for example with catalysts on the basis of antimony and titanium compounds, but also in comparison to products produced under hydrotalcite catalysis.

Through the combination of hydrotalcite-analogous compound/stabilizer, molecular weight degradation and discoloration of the polyester can be lowered significantly without a negative influence on other important processing properties of the polyester, for example the crystallization behavior and the clarity of the final product.

In the following, the invention will be explained on the basis of exemplified embodiments.

In a 250-ml, single-necked flask with agitator and distillation attachment, 100 g precondensate of terephthalic acid and ethylene glycol with an average molecular weight was placed together with the catalyst. This apparatus was evacuated to about 0.5 mbar and purged with nitrogen. This process was repeated a total of three times. The glass flask was dipped into a hot salt bath at 280° C. and the precondensate allowed to melt at this temperature. As soon as the melting was complete, vacuum was carefully applied.

Following termination of the polycondensation by purging with nitrogen, the product was allowed to cool in the flask, and the polyester was characterized according to its separation from the adhering glass.

The intrinsic viscosity (IV) was determined on an apparatus from the Schott Company (AVSPro) of 250 mg resin dissolved in 50 ml phenol/dichlorobenzene (1:1).

DSC measurements were performed on a Perkin-Elmer DSC 7.

The acetaldehyde determination took place according to the following procedure:

The PET material was precooled in liquid nitrogen and ground in an ultracentrifuge mill. The ground material was immediately weighed into a headspace vial and closed gas-tight with a septum. After holding a constant quantity of gas at 150° C. for 90 minutes in the headspace sampler, the gas was injected onto the GC column, at a defined pressure. The color numbers were determined with a LUCI 100 spectrophotometer from the Lange Company.

Table 1 contains characteristic values of polyesters that were obtained by polycondensation reactions at temperatures of 280° C. using various hydrotalcite catalysts.

TABLE 1

Characterization of polyethylene terephthalate from polycondensation reactions with various untreated or calcinated hydrotalcite-analogous derivatives

| Experiment no. | Catalyst | Concentration (ppm) | Reaction time (minutes) | IV (dl/g) | Acetaldehyde (ppm) | $Tg^1$ (° C.) | $Tc^2$ (° C.) | $Tcc^3$ (° C.) | $Tm^4$ (° C.) |
|---|---|---|---|---|---|---|---|---|---|
| 1 (comparison example) | Antimony (III) acetate | 350 | 180 | 0.7480 | 14.2 | 79.7 | 198.9 | 163.2 | 248.6 |
| 2 (example in acc. with the invention) | Al—Mg-hydrotalcite (acc. to U.S. Pat. 5,437,720); calcinated (18 hours, 450° C.) | 100 | 180 | 0.5648 | 14.4 | 78.9 | 197.1 | 143.5 | 254.3 |
| 3 (example in acc. with the invention) | Al—Mg-hydrotalcite (acc. to U.S. Pat. 5,437,720); calcinated (18 hours, 450° C.) | 250 | 165 | 0.7350 | 20.7 | 81.5 | 184 | 153.5 | 251.7 |
| 4 (example in acc. with the invention) | Al—Mg-hydrotalcite (acc. to U.S. Pat. 5,437,720); calcinated (18 hours, 450° C.) | 500 | 150 | 0.6862 | 16.7 | 80.9 | 183.2 | 150.8 | 250.1 |
| 5 (example in acc. with the invention) | Al—Mg-hydrotalcite (acc. to U.S. Pat. 5,437,720); calcinated (18 hours, 450° C.) | 1000 | 150 | 0.8412 | 17.4 | 82.5 | 179.3 | 154.2 | 252.9 |
| 6 (example in acc. with the invention) | Al—Mg-hydrotalcite (acc. to U.S. Pat. 5,437,720) | 1000 | 90 | 0.8893 | 44 | 84.1 | 175.2 | 153.5 | 252.3 |
| 7 (example in acc. with the invention) | $Zn_6Al_2(OH)_{16}CO_3*H_2O$ calcinated (18 hours, 450° C.) | 500 | 180 | 0.6932 | 16.4 | 81.9 | 185.3 | 152.8 | 254.4 |
| 8*(example in acc. with the invention) | $Mg_4Al_2(OH)_{12}(B_3O_3(OH)_4)_2*H_2O$ calcinated (18 hours, 450° C.) | 500 | 210 | 0.6617 | 22.2 | 85.2 | 207.2 |  | 251.6 |
| 9*(example in acc. with the invention) | $Mg_4Al_2(OH)_{12}(B_3O_3(OH)_4)_2*H_2O$ calcinated (18 hours, 450° C.) | 1000 | 150 | 0.7704 | 19.7 | 79.3 | 198.4 | 144 | 249.6 |
| 10*(example in acc. with the invention) | $Mg_3ZnAl_2(OH)_{12}(B_3O_3(OH)_4)_2*H_2O$ calcinated (18 hours, 450° C.) | 1000 | 165 | 0.6302 | 17.3 | 79.6 | 189.4 | 153.5 | 254.3 |
| 11*(example in acc. with the invention) | $Mg_2Zn_2Al_2(OH)_{12}(B_3O_3(OH)_4)_2*H_2O$ calcinated (18 hours, 450° C.) | 1000 | 180 | 0.7031 | 17.3 | 82.5 | 201.8 | 136.1 | 251.6 |
| 12*(example in acc. with the invention) | $MgZn_3Al_2(OH)_{12}(B_3O_3(OH)_4)_2*H_2O$ calcinated (18 hours, 450° C.) | 1000 | 120 | 0.7608 | 20.2 | 84.3 | 201.1 | 138.1 | 255.1 |

TABLE 1-continued

Characterization of polyethylene terephthalate from polycondensation reactions with various untreated or calcinated hydrotalcite-analogous derivatives

| Experiment no. | Catalyst | Concentration (ppm) | Reaction time (minutes) | IV (dl/g) | Acetaldehyde (ppm) | Tg[1] (° C.) | Tc[2] (° C.) | Tcc[3] (° C.) | Tm[4] (° C.) |
|---|---|---|---|---|---|---|---|---|---|
| 13*(example in acc. with the invention | $Zn_4Al_2(OH)_{12}(B_3O_3(OH)_4)_2$* $H_2O$ calcinated (18 hours, 450° C.) | 1000 | 135 | 0.8362 | 22.8 | 83.3 | 200.8 | 137.4 | 251.7 |

*The specification for producing the catalyst tested in this example can be found in: A. Bhattacharyya, D.B. Hall: Materials Synthesis and Characterization, 1997, 139–145.
[1]Glass temperature; [2]crystallization temperature; [3]cold crystallization; [4]melting point.

Table 1 clearly shows that all tested untreated or calcinated hydrotalcite-analogous derivatives have catalytic activity. The synthesized polyethylene terephthalate, depending on the catalyst used, has different processing-related properties.

An additional important criterion for assessing the suitability of untreated or calcinated hydrotalcite-analogous derivatives is their catalytic activity in so-called solid state polymerization (SSP).

For these experiments, six of the polyesters listed in Table 1 were subjected to SSP. For this purpose the products were left for 96 hours at 200° C. in a vacuum drying oven. After cooling, characteristic values relevant for applications technology were determined.

The results of solid state polymerizations of polyethylene terephthalate are summarized in Table 2.

which contain at least one hydrolyzable phosphorus-oxygen bond is described in the examples that follow.

EXAMPLE 14 (COMPARISON EXAMPLE)

In a 200 liter reactor of alloyed steel, a suspension of 60.675 kg terephthalic acid and 1.44 kg isophthalic acid were placed in 31.6 kg ethylene glycol. Under agitation, this reaction mixture was treated with 45.5 g antimony triacetate and 8.125 g cobalt acetate tetrahydrate in 1000 g ethylene glycol, and 34.65 g tetramethylammonium hydroxide in 500 g ethylene glycol. The closed reactor was heated to 272° C. At 2.8 bar the slow expansion of the pressurized container

TABLE 2

Polyesters from solid state polymerization

| No. | Catalyst | Concentration (ppm) | IV (dl/g) after polycondensation | IV (dl/g) after SSP | Acetaldehyde (ppm) | Tg (° C.) | Tc (° C.) | Tcc (° C.) | Tm (° C.) |
|---|---|---|---|---|---|---|---|---|---|
| 1 | $Zn_6Al_2(OH)_{16}CO_3$*$H_2O$ calcinated (18 hours, 450° C.) | 500 | 0.6932 | 1.1891 | 0.3 | 84.1 | 162.8 | 166.9 | 249.6 |
| 2 | Al—Mg-hydrotalcite (acc. to U.S. Pat. 5,437,720); calcinated (18 hours, 450° C.) | 100 | 0.5648 | 0.7755 | 0.4 | 82.2 | 178.6 | 156.1 | 253 |
| 3 | Al—Mg-hydrotalcite (acc. to U.S. Pat. 5,437,720); calcinated (18 hours, 450° C.) | 250 | 0.7350 | 0.9549 | 0.4 | 83.9 | 172.9 | 161.5 | 253 |
| 4 | Al—Mg-hydrotalcite (acc. to U.S. Pat. 5,437,720); calcinated (18 hours, 450° C.) | 500 | 0.6862 | 1.0775 | 0.3 | 83.1 | 166.2 | 161.5 | 249.6 |
| 5 | Al—Mg-hydrotalcite (acc. to U.S. Pat. 5,437,720); calcinated (18 hours, 450° C.) | 1000 | 0.8412 | 1.1005 | 0.3 | 84.4 | 170.9 | 162.8 | 252.3 |
| 6 | Al—Mg-hydrotalcite (acc. to US Patent 5,437,720) | 1000 | 0.8893 | 1.301 | 0.9 | 84.6 | 176.7 | 155.5 | 253.2 |
| 7 | $Mg_3Al_2(OH)_{12}(B_3O_3(OH)_4)_2$* $H_2O$ calcinated (18 hours, 450° C.) | 500 | 0.6617 | 0.8509 | 0.6 | 83.5 | 201.4 | 140.8 | 253.0 |
| 8 | $Mg_3Al_2(OH)_{12}(B_3O_3(OH)_4)_2$* $H_2O$ calcinated (18 hours, 450° C.) | 1000 | 0.6302 | 0.8009 | 0.6 | 82.7 | 179.2 | 161.5 | 254.4 |

Table 2 shows the fundamental suitability of the untreated or calcinated hydrotalcite-analogous derivatives as catalysts for polycondensation reactions in both liquid and solid phase.

It is especially important that it is possible by selecting the constituents of these complex catalysts to systematically influence the process technology properties of the polyester resins, for example the crystallization behavior.

The use of the hydrotalcite catalysts in accordance with the invention in combination with phosphorous compounds was started. After about 20 minutes under normal pressure, 12 g phosphoric acid in 500 g ethylene glycol were added. Then the liquid phase polymerization was started by slow application of the vacuum. After about 60 minutes the final vacuum of about 4 mbar was reached. The end of the reaction was shown by the attainment of a defined rotary momentum. The reaction vessel was relaxed with nitrogen, and the reactor emptied through several nozzles over a period of about 60 minutes into a water bath. The product strands were immediately granulated.

The molecular weight and the color of various product batches were determined.

Table 3 gives a survey of the values determined.

EXAMPLE 15 (COMPARISON EXAMPLE)

In an apparatus in analogy to Example 14, the same amount of terephthalic and isophthalic acid as well as ethylene glycol, tetramethylammonium hydroxide, and cobalt acetate tetrahydrate were placed as in Example 14. After the esterification was complete, under a slight vacuum 20 g Pural (hydrotalcite with about 60 percent magnesium) were added. The addition of phosphoric acid was not performed. The liquid phase polycondensation was performed and ended in the manner described in Example 14.

EXAMPLE 16 (EXEMPLIFIED EMBODIMENT)

In an apparatus analogous to Example 14, a polycondensation was performed under the same conditions and with the same additives as in Example 15, but without isophthalic acid. Along with the hydrotalcite Pural (20 g), 80 g Irganox 1425 (phosphoric acid ester-based stabilizer from Ciba Geigy) was added to the reaction mixture.

Table 3 contains characteristic values for individual granulate fractions.

EXAMPLE 17 (EXEMPLIFIED EMBODIMENT)

Analogous to Example 16, but with the quantity of isophthalic acid given in Example 14, 20 g Pural, and 20 g Irganox 1425.

Characteristic values of the granulate fractions are contained in Table 3.

EXAMPLE 18 (EXEMPLIFIED EMBODIMENT)

Analogous to Example 17, but with 20 g Pural and 40 g Irganox 1425.

The characteristic values determined for individual product fractions are summarized in Table 3.

EXAMPLE 19 (COMPARISON EXAMPLE)

Analogous to Example 17, but with 20 g Pural and 40 g Irgafos 168.

Characteristic values of the granulate fractions are contained in Table 3

EXAMPLE 20 (EXEMPLIFIED EMBODIMENT)

Analogous to Example 17, but with 20 g Pural and 40 g Irganox PEPQ.

TABLE 3

Characteristic values of various polyester fractions as a function of the catalyst-stabilizer system used.

| Experiment | Product fraction no. | Catalyst | Catalyst concentration (ppm) | Stabilizer | Stabilizer concentration (ppm) | Intrinsic viscosity dl/g | ä - IV (dl/g) | B* - color number | ä - color number |
|---|---|---|---|---|---|---|---|---|---|
| Example 14 (comparison example) | 1<br>4 | Antimony triacetate | 640 | | | 0.69<br>0.655 | 0.035 | 1.08<br>3.2 | 1.12 |
| Example 15 (comparison example) | 1<br>4 | Hydrotalcite | 250 | | | 0.7051<br>0.6113 | 0.093 | 0.53<br>5.35 | 4.82 |
| Example 16 (exemplified embodiment) | 1<br>6 | Hydrotalcite | 250 | Irganox 1425 | 1000 | 0.6463<br>0.6251 | 0.021 | −4.61<br>−2.11 | 2.5 |
| Example 17 (exemplified embodiment) | 1<br>5 | Hydrotalcite | 250 | Irganox 1425 | 250 | 0.674<br>0.606 | 0.068 | −0.31<br>3.42 | 3.73 |
| Example 18 (exemplified embodiment) | 1<br>5 | Hydrotalcite | 250 | Irganox 1425 | 500 | 0.683<br>0.637 | 0.046 | −2.54<br>0.66 | 3.2 |
| Example 19 (comparison example*) | 1<br>5 | Hydrotalcite | 250 | Irgafos 168 | 500 | 0.6848<br>0.6118 | 0.073 | 1.98<br>3.81 | 1.83 |
| Example 20 (exemplified embodiment) | 1<br>5 | Hydrotalcite | 250 | Irganox PEPQ | 500 | 0.672<br>0.624 | 0.048 | −2.32<br>0.71 | 3.03 |

*Given as "exemplified embodiment" in text.

Tables 2 and 3 illustrate the advantages of hydrotalcites as catalysts for polycondensation reactions. Hydrotalcites at substantially lower concentrations have the same catalytic effectiveness as conventional polycondensation catalysts such as antimony compounds. In combination with the excellent food compatibility, with this new class of polycondensation catalysts an excellent alternative is provided to the currently commercially utilized catalytically active compounds.

The combination hydrotalcite/phosphoric acid ester or phosphorous acid ester permits the synthesis of polyesters with a very high thermal stability. The molecular weight breakdown during processing listed in Table 3 is more favorable than in the case of the polyesters produced under antimony catalysis.

In addition, the products are characterized by a low color tint.

The combination hydrotalcite/phosphoric acid ester or phosphorous acid ester can also used for the synthesis of other polyesters and for insertion of other monomers into polyalkylene terephthalate

What is claimed is:

1. Catalyst systems for polycondensation reactions comprising hydrotalcite-analogons derivatives of the general formula $$[M(II)_{1-x}M(III)_x(OH)_2]^{k+}(A^{n-}_{x/n}) \cdot mH_2O$$

wherein M(II): divalent metals, M(III): trivalent metals, and A is selected from the group consisting of carbonate, borate and titanyl anions in combination with a phosphorus compound containing at least one hydrolyzable phosphorus-oxygen bond.

2. Catalyst systems for polycondensation reactions in accordance with claim 1, characterized in that M(II) is Mg or Zn or Ni or Cu or Fe(II) or Co.

3. Catalyst systems for polycondensation reactions according to claim 2, characterized in that M(III) is Al or Fe(III).

4. Catalyst systems for polycondensation reactions according to claim 3, characterized in that the hydrotalcite-analogous is derivatives are calcinated at temperatures of 200° C. to 800° C.

5. Catalyst systems for polycondensation reactions in accordance with claim 3, characterized in that the particle sizes of the hydrotalcites-analogous derivatives are in the range of 0.1 to 50 μm.

6. Catalyst systems for polycondensation reactions in accordance with claim 1, characterized in that as the phosphorus compounds, are selected from phosphoric acid esters or esters of phosphorous acid.

7. Catalyst systems for polycondensation reactions in accordance with claim 6, characterized in that the catalyst system is used in the proportion, hydrotalcite analogous derivatives to phosphorus compound, of 1:0.5 to 1:4.

8. Catalyst systems for polycondensation reactions in accordance with claim 1 wherein the system is substantially free of Antimony.

9. A catalyst system for catalyzing a polycondensation reaction for making a polyester material comprising:

a) at least one hydrotalcize-analogous derivative consisting of a material represented by the general formula:

$$[M(II)_{1-x}M(III)_x(OH)_2]^{k+}(A^{n-}_{x/n}) \cdot mH_2O$$

wherein M(II) is a divalent metal selected from at least one of: Mg, Zn, Ni, Cu, Fe(II) and Co; M(III) is a trivalent metal selected from at least one of: Al and Fe(III); and A is an anion is selected from at least one of: carbonates, borates and titanyls; and b) a phosphorus compound containing at least one hydrolyzable phosphorus-oxygen bond.

* * * * *